(12) United States Patent
Gryaznov (10) Patent No.: US 8,301,904 B1
(45) Date of Patent: Oct. 30, 2012

(54) SYSTEM, METHOD, AND COMPUTER PROGRAM PRODUCT FOR AUTOMATICALLY IDENTIFYING POTENTIALLY UNWANTED DATA AS UNWANTED

(75) Inventor: Dmitry O. Gryaznov, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 664 days.

(21) Appl. No.: 12/144,967

(22) Filed: Jun. 24, 2008

(51) Int. Cl.
*G06F 11/30* (2006.01)

(52) U.S. Cl. ............ 713/188; 726/23; 726/24

(58) Field of Classification Search .......... 713/188; 726/23, 24
See application file for complete search history.

(56) References Cited

U.S. PATENT DOCUMENTS

| | | | |
|---|---|---|---|
| 6,697,948 B1 | 2/2004 | Rabin | |
| 6,708,212 B2 | 3/2004 | Porras et al. | |
| 6,981,155 B1 | 12/2005 | Lyle et al. | |
| 7,095,716 B1 | 8/2006 | Ke et al. | |
| 7,409,712 B1* | 8/2008 | Brooks et al. | 726/22 |
| 7,512,977 B2 | 3/2009 | Cook et al. | |
| 7,752,667 B2* | 7/2010 | Challener et al. | 726/24 |
| 7,945,787 B2 | 5/2011 | Gassoway | |
| 2004/0042416 A1 | 3/2004 | Ngo et al. | |
| 2004/0203589 A1* | 10/2004 | Wang et al. | 455/410 |
| 2005/0015455 A1 | 1/2005 | Liu | |
| 2005/0027818 A1 | 2/2005 | Friedman et al. | |
| 2005/0262576 A1 | 11/2005 | Gassoway | |
| 2006/0036693 A1 | 2/2006 | Hulten et al. | |
| 2006/0070130 A1* | 3/2006 | Costea et al. | 726/24 |
| 2006/0150256 A1 | 7/2006 | Fanton et al. | |
| 2007/0016953 A1 | 1/2007 | Morris et al. | |
| 2007/0079379 A1* | 4/2007 | Sprosts et al. | 726/24 |
| 2007/0226804 A1 | 9/2007 | Somkiran et al. | |
| 2007/0240220 A1 | 10/2007 | Tuvell et al. | |
| 2007/0261112 A1 | 11/2007 | Todd et al. | |
| 2008/0126779 A1 | 5/2008 | Smith | |
| 2008/0168533 A1 | 7/2008 | Ozaki et al. | |
| 2008/0196099 A1 | 8/2008 | Shastri | |
| 2008/0295177 A1 | 11/2008 | Dettinger et al. | |
| 2009/0064329 A1 | 3/2009 | Okumura et al. | |
| 2009/0088133 A1 | 4/2009 | Orlassino | |
| 2009/0097661 A1 | 4/2009 | Orsini et al. | |
| 2010/0031358 A1 | 2/2010 | Elovici et al. | |
| 2011/0138465 A1 | 6/2011 | Franklin et al. | |

OTHER PUBLICATIONS

U.S. Appl. No. 12/131,383, which was filed Jun. 2, 2008.
U.S. Appl. No. 11/946,777, which was filed Nov. 28, 2007.
U.S. Appl. No. 12/111,846, which was filed Apr. 29, 2008.
"VMware DiskMount Utility: User's Manual", http://www.vmware.com/pdf/VMwareDiskMount.pdf, 1998-2005, Revision Apr. 8, 2005, VMware, Inc., 6 pages.
Wolf, Chris, Column: "Virtual Server 2005 R2 SP1 Treasures: VHD Mount", Jun. 2007, Microsoft Certified Professional Magazine Online, Downloaded on Feb. 27, 2008 from -http://mcpmag.com/columns/article.asp?EditorialsID=1793- pp. 1-5.
"chroot(2)—Linux man page", Downloaded on Feb. 27, 2008 from -http://linux.die.net/man/2/chroot- pp. 1-2.

(Continued)

*Primary Examiner* — Christopher Brown
(74) *Attorney, Agent, or Firm* — Wong, Cabello, Lutsch, Rutherford & Brucculeri, LLP (57) ABSTRACT

A system, method, and computer program product are provided for automatically identifying potentially unwanted data as unwanted. In use, data determined to be potentially unwanted (e.g. potentially malicious) is received. Additionally, the data is automatically identified as unwanted (e.g. malicious). Furthermore, the data is stored for use in detecting unwanted data (e.g. malicious data).

25 Claims, 6 Drawing Sheets

OTHER PUBLICATIONS

"Linux/Unix Command: chroot", Downloaded on Feb. 27, 2008 from -http://linux.about.com/library/cmd/blcmdl2_chroot. htm- pp. 1-3.
Non-Final Office Action Summary from U.S. Appl. No. 11/946,777 dated Jan. 5, 2011.
Christodorescu, Miha et al. "Testing Malware Detectors", In the Proceedings of the ACM SIGSOFT International Symposium on Software Testing and Analysis (ISSTA '04), vol. 29, Issue 4, Jul. 11-14, 2004, Boston Massachusetts, 11 pages.
"Blacklist," Wikipedia, last modified Jun. 5, 2008, http://en.wikipedia.org/wiki/Blacklist.
Office Action Summary from U.S. Appl. No. 12/111,846 dated Jun. 24, 2011.
Office Action Summary from U.S. Appl. No. 12/131,383 dated Jun. 24, 2011.
An Architecture for Generating Semantics-Aware Signatures; Vinod Yegneswaran, Jonathon T. Giffin, Paul Barford, Somesh Jha; Appeared in Proceedings of Usenix Security Symposium 2005, year 2005, all pages.
U.S. Appl. No. 12/050,432, which was filed on Mar. 18, 2008.
Office Action Summary from U.S. Appl. No. 11/946,777 dated Jun. 13, 2011.
Office Action Summary from U.S. Appl. No. 12/050,432 dated Oct. 6, 2010.
Office Action Summary from U.S. Appl. No. 12/050,432 dated May 13, 2011.
Non-Final Office Action dated Mar. 12, 2012 for U.S. Appl. No. 12/050,432.
Final Office Action dated Oct. 17, 2011 for U.S. Appl. No. 12/131,383.
Non-Final Office Action dated Mar. 6, 2012 for U.S. Appl. No. 12/131,383.
U.S. Appl. 12/398,073, filed Mar. 4, 2009.
Non-Final Office Action dated Oct. 4, 2011 for U.S. Appl. No. 12/398,073.
Final Office Action dated Apr. 12, 2012 for U.S. Appl. No. 12/398,073.
Final Office Action, dated Dec. 29, 2011 for U.S. Appl. No. 11/946,777.

* cited by examiner

SYSTEM, METHOD, AND COMPUTER PROGRAM PRODUCT FOR AUTOMATICALLY IDENTIFYING POTENTIALLY UNWANTED DATA AS UNWANTED

FIELD OF THE INVENTION

The present invention relates to security systems, and more particularly to identifying unwanted data.

BACKGROUND

Security systems have traditionally been concerned with identifying unwanted (e.g., malicious) data and acting in response thereto. For example, data which is undetermined to be malicious may be communicated to a security system, and the data may further be analyzed by the security system for determining whether the data is malicious. However, traditional techniques for determining whether data is malicious have generally exhibited various limitations.

For example, security systems that determine whether data is malicious are oftentimes in communication with multiple other devices, and therefore conventionally receive numerous requests to determine whether data is malicious from such devices. When numerous requests are received in this manner, significant delays by the security systems in determining whether the data is malicious and responding to the devices based on the determinations generally exist. Further, the responses generated by the security systems based on such determinations are customarily formed as updates to security systems installed on the devices. However, many times the devices themselves delay installation of the updates when such updates are available from the security systems, thus resulting in a delayed identification by the devices of whether data is in fact malicious.

There is thus a need for overcoming these and/or other issues associated with the prior art.

SUMMARY

A system, method, and computer program product are provided for automatically identifying potentially unwanted data as unwanted. In use, data determined to be potentially unwanted (e.g. potentially malicious) is received. Additionally, the data is automatically identified as unwanted (e.g. malicious). Furthermore, the data is stored for use in detecting unwanted data (e.g. malicious data).

DETAILED DESCRIPTION

Figure 1:
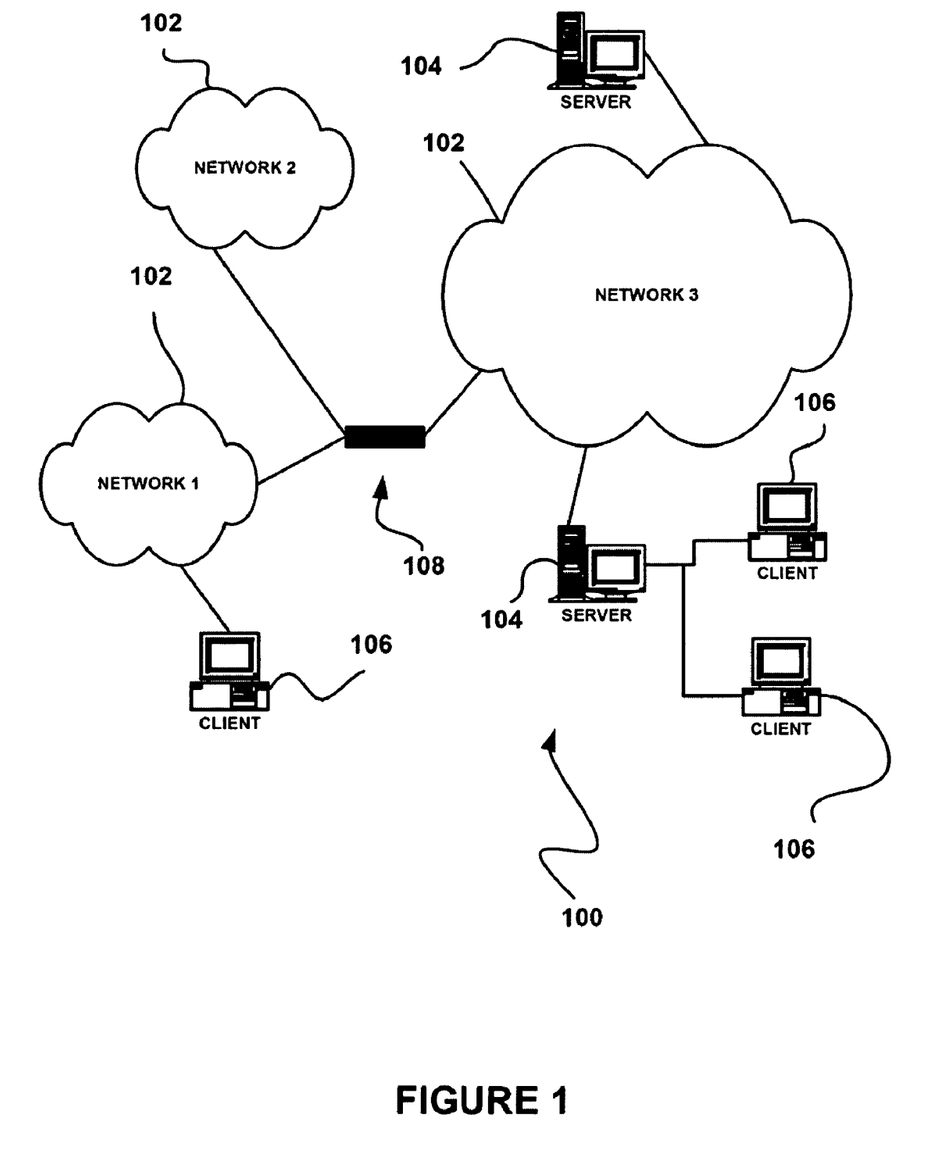
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g., printer, etc.), any component of a computer, and/or any other type of logic. In order to facilitate communication among the networks 102, at least one gateway 108 is optionally coupled therebetween.

Figure 2:
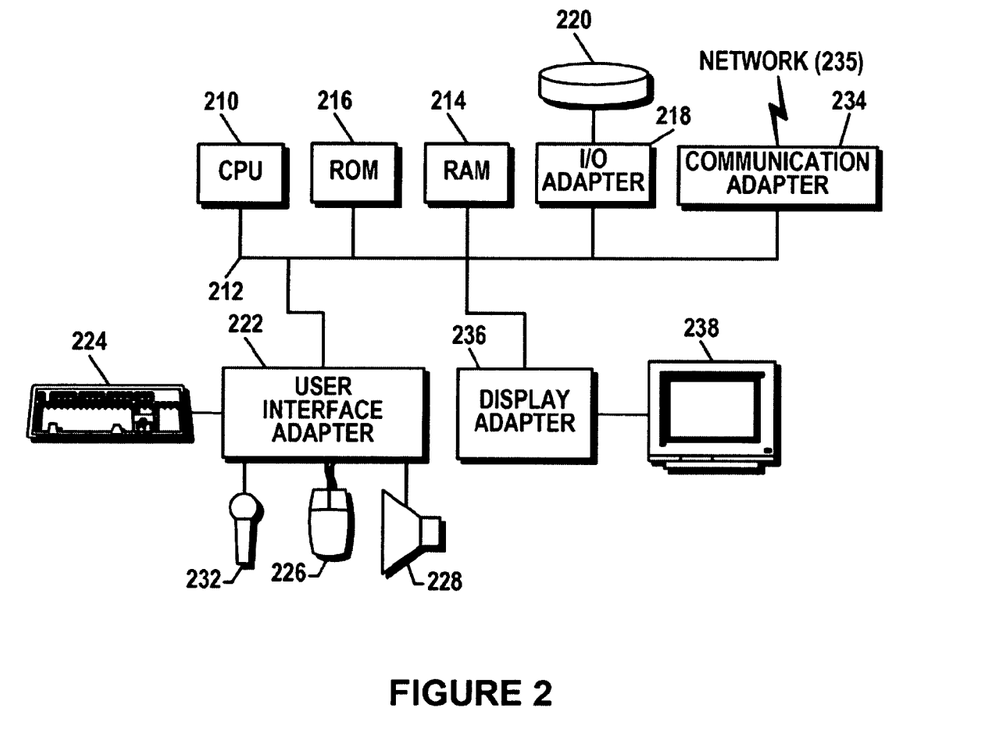
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
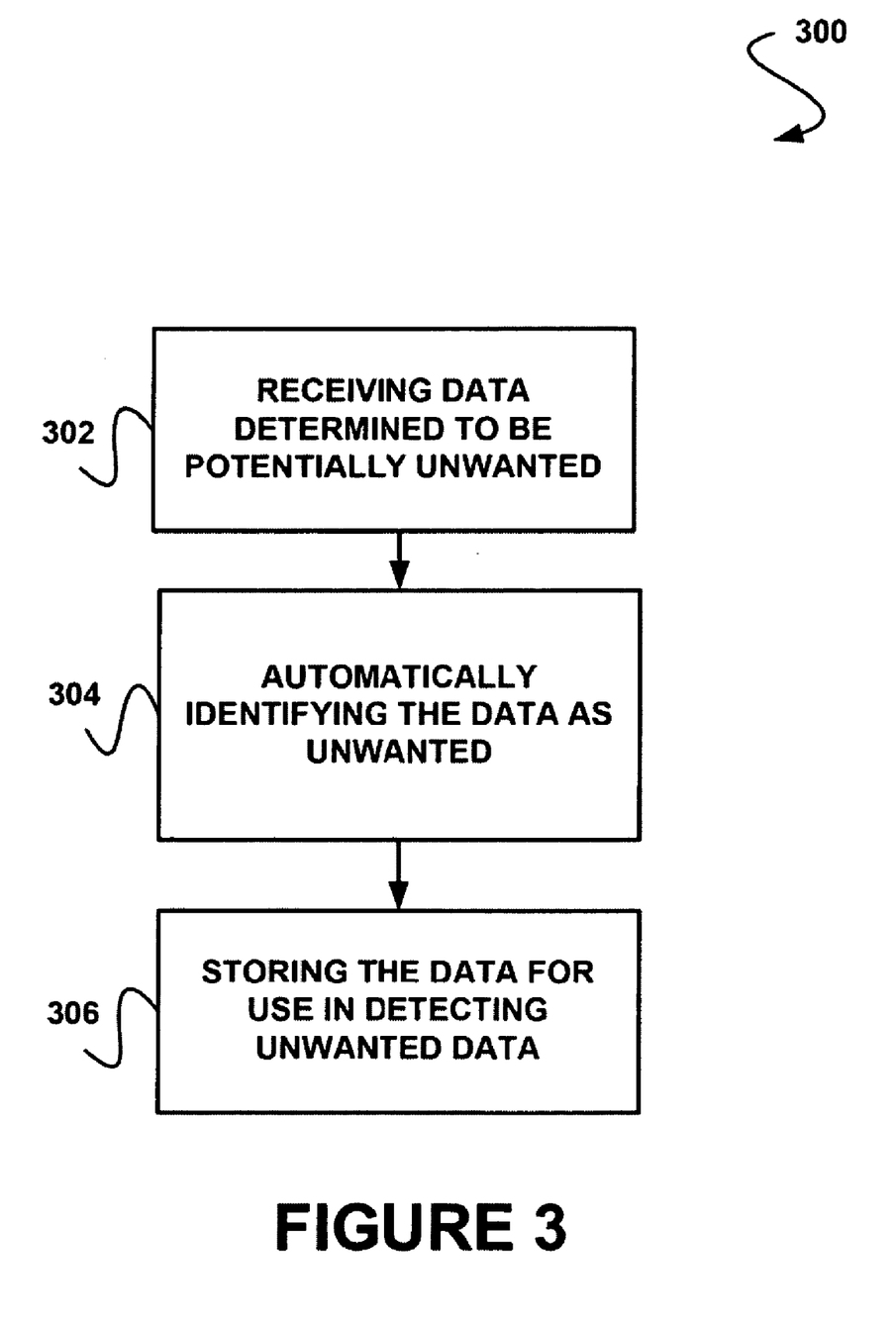
FIG. 3 shows a method for automatically identifying potentially unwanted (e.g. potentially malicious) data as unwanted (e.g. malicious), in accordance with one embodiment.

FIG. 3 shows a method 300 for automatically identifying potentially unwanted (e.g. potentially malicious) data as unwanted (e.g. malicious), in accordance with one embodiment. As an option, the method 300 may be carried out in the context of the architecture and environment of FIGS. 1 and/or 2. Of course, however, the method 300 may be carried out in any desired environment.

As shown in operation 302, data determined to be potentially unwanted (e.g. potentially malicious) is received. In the context of the present description, the data determined to be potentially unwanted may include any data for which it is unknown whether such data is unwanted (e.g. malicious). Thus, in one embodiment, the data may be determined to be unwanted by determining that it is unknown whether the data is unwanted. It should be noted that such data may include any code, application, file, electronic message, process, thread, etc. that is potentially unwanted.

In another embodiment, it may be determined that it is unknown whether the data is unwanted based on an analysis of the data. For example, it may be determined that it is unknown whether the data is unwanted by determining that the data does not match known wanted data (e.g. data predetermined to be wanted, whitelisted data, etc.) and that the data does not match known unwanted data (e.g. data predetermined to be unwanted, blacklisted data, etc.). To this end, the data may be compared to the known wanted data and the known unwanted data for determining whether it is unknown that the data is unwanted.

As another example, the potentially unwanted data may not necessarily match a hash, signature, etc. of known unwanted data. As another example, the potentially unwanted data may not necessarily match a hash, signature, etc. of known wanted data. Such data may be determined to be potentially unwanted based on a scan of the data (e.g., against signatures of known wanted data and/or known unwanted data, etc.), as an option.

In yet another embodiment, the data may be determined to be potentially unwanted if it is determined that the data is suspicious based on an analysis thereof. For example, the data may be determined to have one or more characteristics of malware based on the analysis. In another example, the data may be determined to be a possible new variant of existing malware. To this end, the potentially unwanted data may include data that is determined to potentially include malware, spyware, adware, etc.

Additionally, in one embodiment, the data may be determined to be potentially unwanted based on monitoring performed with respect to the data. For example, the monitoring may include identifying the data (e.g. based on operations performed in association with the data, etc.) and performing an analysis of the data, such as the analysis described above for example. Optionally, the monitoring may be of an electronic messaging application [e.g. electronic mail (email) messaging application], a file transfer protocol (FTP), at least one web site, etc.

In another embodiment, the data may be determined to be potentially unwanted based on a heuristic analysis. In yet another embodiment, the data may be determined to be potentially unwanted based on a behavioral analysis. In yet another embodiment, the data may be determined to be potentially unwanted based on scanning performed on the data. Of course, however, data may be determined to be potentially unwanted in any desired manner.

Further, the data may be determined to be potentially unwanted by a remote source. As another option, the data determined to be potentially unwanted may be received from such remote source. In one embodiment, such data may be automatically received based on the monitoring described above. Just by way of example, the remote device may automatically transmit the data in response to a determination that the data is potentially unwanted (e.g. that it is unknown whether such data is unwanted, etc.).

As an option, the data determined to be potentially unwanted may be received by a server. In one embodiment, the server may be utilized by a security vendor. Such security vendor may optionally provide known wanted data and/or known unwanted data (e.g. via updates, etc.) to a plurality of client devices, such that the client devices may utilize the known wanted data and/or known unwanted data for determining whether data is wanted and/or unwanted, respectively. To this end, the server may optionally receive the data determined to be potentially unwanted for analysis purposes, such as for determining whether the data is wanted or unwanted. Further, based on the determination, the server may be utilized to provide an indication of the determination (e.g. via an update, etc.) to a source from which the data was received and/or to any other desired device.

Moreover, as shown in operation 304, the data is automatically identified as unwanted (e.g. malicious). In one embodiment, automatically identifying the data as unwanted may include any determination that the data is unwanted which does not necessarily rely on an analysis of the data. For example, the data may be automatically identified as unwanted without necessarily scanning the data, comparing the data to known wanted data and/or known unwanted data, etc.

In another embodiment, the data may be automatically identified as unwanted based on at least one source from which the data is received. As an option, the data may be automatically identified as unwanted based on a type of the source from which the data is received. For example, if the source includes a security vendor, a multi-scanner service, a honeypot, etc., the data may be automatically identified as unwanted.

As another option, the data may be automatically identified as unwanted if it is determined that other data previously received from the source (e.g. received previous to that received in operation 302) includes known unwanted data. For example, if other data previously received from the source was determined to be unwanted, the data received in operation 302 may be automatically identified as unwanted. As another example, if a predefined threshold amount (e.g. percentage, etc.) of data previously received from the source was determined to be unwanted, the data received in operation 302 may be automatically identified as unwanted. In this way, the data may be automatically identified as unwanted if potentially unwanted data received from such source was determined to be unwanted, if a threshold amount of potentially unwanted data received from such source was determined to be unwanted, if all potentially unwanted data received from such source was determined to be unwanted, etc.

As yet another option, the data may be automatically identified as unwanted if it is determined that the data was received by a predefined threshold number of different sources. Such predefined threshold number may be user-configured, in one embodiment. For example, if the data was independently received (e.g. different copies of the data were received) by the predefined threshold number of different sources, the data may be automatically identified as unwanted.

As still yet another option, the data may be automatically identified as unwanted if it is determined that a weight assigned to the source from which the data was received meets a predefined threshold weight. The predefined threshold weight may be user-configured, in one embodiment. Additionally, the weight assigned to the source may be based on any desired aspect of the source, such as a type of the source, an amount of potentially unwanted data previously received from the source that was determined to be unwanted, etc. As another option, the data may be automatically identified as unwanted if it is determined that an aggregate weight calculated from weights of each source from which the data was received meets the predefined threshold weight. Of course, however, the data may be automatically identified as unwanted in any desired manner.

In one embodiment, the data may be automatically identified as unwanted based on a probability that the data is actually unwanted. For example, if the source of the data includes a predetermined type of source, is associated with previously received data determined to be unwanted, etc., the probability that the data is unwanted may be determined to meet a threshold probability. In this way, prior to determining whether the data is unwanted via an analysis of the data, the data may optionally be automatically identified as unwanted.

Still yet, as shown in operation 306, the data is stored for use in detecting unwanted data. With respect to the present description, the data may be stored in any desired type of data structure capable of allowing the data to be used in detecting unwanted data. In various embodiments, the data may be stored in a database, a list of known unwanted data (e.g. a blacklist), etc.

As an option, storing the data may include storing a hash of the data. As another option, a plurality of different types of hashes of the data may be stored. The hash may be computed utilizing message-digest algorithm 5 (MD5), secure hash algorithm-1 (SHA-1), secure hash algorithm-256 (SHA-256), etc.

Further, in one embodiment, an indication that the data is unwanted may be stored in association with the data. Such indication may include any type of identifier, for example. In another embodiment, an indication that the data is potentially unwanted data automatically determined to be unwanted data may be stored in association with the data.

Further still, the stored data may be used for detecting unwanted data by being identifiable as known unwanted data. As an option, other received data determined to be potentially unwanted may be compared with the stored data for determining whether such other received data is unwanted. For example, if the other received data matches the stored data, the other received data may be determined to be unwanted. As another example, if a hash of the other received data matches a hash of the stored data, the other received data may be determined to be unwanted. Thus, the stored data may optionally be used by the device (e.g. server) on which such data is stored for detecting unwanted data.

As another option, the stored data may be utilized by any other device (e.g. client device, etc.) for detecting unwanted data. Just by way of example, a remote client device may detect other potentially unwanted data (e.g. utilizing a security system, etc.), may calculate a hash of such potentially unwanted data, and may remotely query a database storing the stored data. If the query returns the stored data, the other device may determine that the other potentially unwanted data is unwanted. Of course, it should be noted that the stored data may be used in detecting unwanted data in any desired manner.

To this end, data determined to be potentially unwanted may be automatically identified as unwanted, prior to determining whether the data includes unwanted data via an analysis of such data. Moreover, storing the data automatically determined to be unwanted for use in detecting unwanted data may allow the data to be used in detecting unwanted data upon the storage of the data. Thus any delay in using the data for detecting unwanted data may be prevented, where such delay results from a delay in determining whether the data is actually unwanted (e.g. via an the analysis of such data), from a wait time resultant from a queue of stored data waiting to be processed for determining whether any of such data is actually unwanted, from a delay in providing an update of known unwanted data and/or known wanted data to client devices detecting the potentially unwanted data, from a delay in installing such update by the client devices, etc.

As an option, once the data is stored for use in detecting unwanted data, a subsequent analysis of the data may be performed for determining whether the data actually includes unwanted data. The subsequent analysis may be performed at any desired time, as the stored data may already be capable of being used to detect unwanted data. Just by way of example, the stored data may be identified by identifying data stored with an indication that the data includes potentially unwanted data automatically identified as unwanted.

In addition, the stored data may be analyzed, in response to identification thereof, and it may be determined whether the data is unwanted based on the analysis. Accordingly, if the data is determined to be unwanted, a list of known unwanted data may be updated. However, if it is determined that the data is wanted, a list of known wanted data may be updated. Such updated list of known unwanted data or known wanted data may further be provided to the source from which the data determined to be potentially unwanted was received (in operation 302) and/or to any other desired device for local use in detecting unwanted data.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
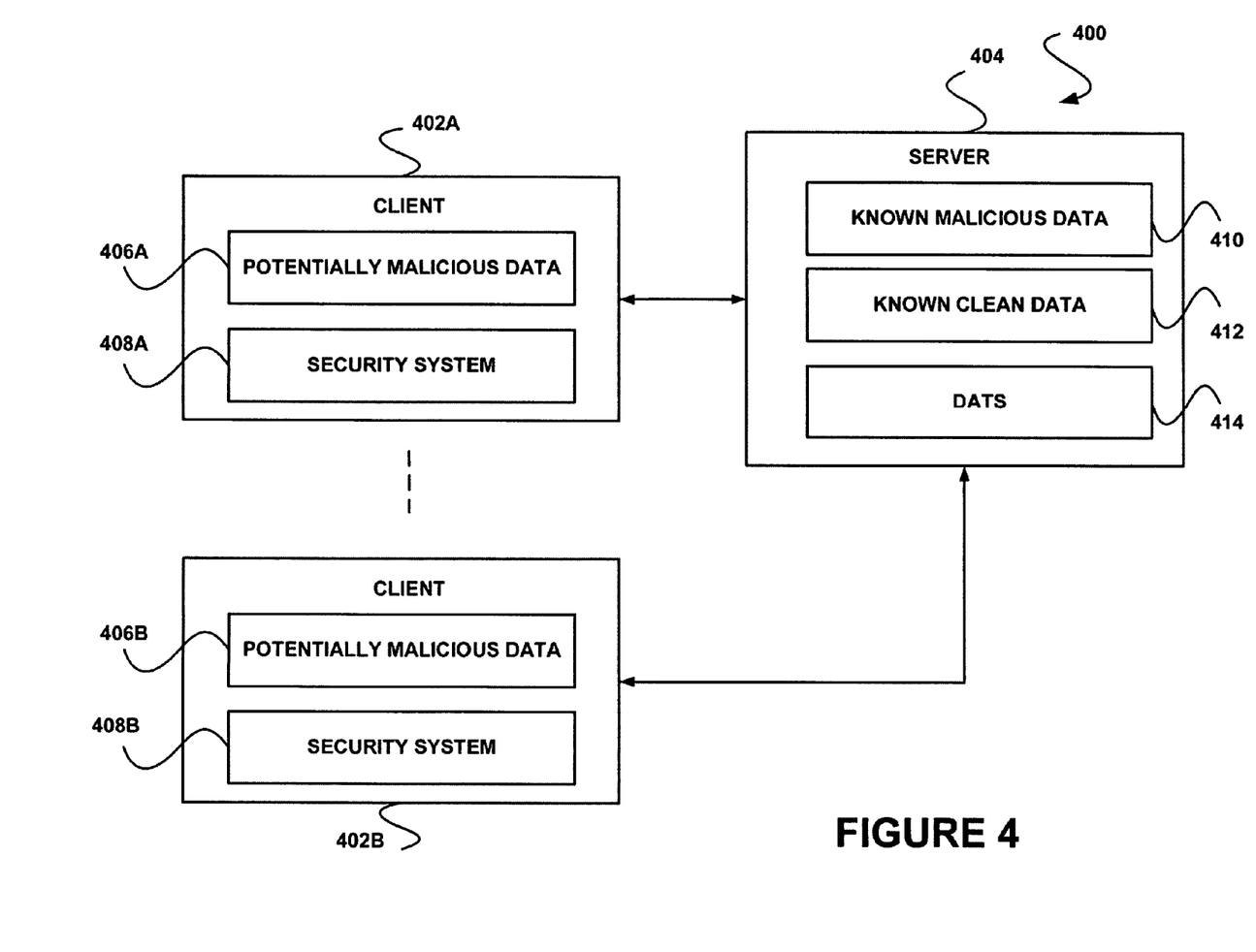
FIG. 4 shows a system for automatically identifying potentially unwanted (e.g. potentially malicious) data as unwanted (e.g. malicious), in accordance with another embodiment.

FIG. 4 shows a system 400 for automatically identifying potentially unwanted (e.g. potentially malicious) data as unwanted (e.g. malicious), in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, a server 404 is in communication with clients 402A-402B. In one embodiment, the clients 402A-402B may include any client capable of detecting potentially malicious data 406A-406B that may be in communication with the server 404. For example, the clients 402A-402B may include one or more of the clients illustrated in FIG. 1. Additionally, in another embodiment, the server 404 may include any server capable of automatically identifying the potentially malicious data 406A-406B as malicious and storing such data for use in detecting malicious data. For example, the server 404 may include the server illustrated in FIG. 1.

Additionally, each of the clients 402A-402B includes a security system 408A-408B. In the context of the current embodiment, the security systems 408A-408B may include any system utilized by the clients 402A-402B to detect malicious data. For example, the security systems 408A-408B may include a firewall, an anti-virus system, an anti-spyware system, etc.

In one embodiment, the security systems 408A-408B may be constantly running on the clients 402A-402B. In another embodiment, the security systems 408A-408B may periodically run on the clients 402A-402B. Of course, however, the security systems 408A-408B may interact with the clients 402A-402B in any manner.

To this end, each security system 408A-408B may identify data 406A-406B on an associated client 402A-402B as potentially malicious. While the present embodiment is described below with respect to only one of the clients 402A-402B, it should be noted that the clients 402A-402B may operate in a similar manner. Thus, the present system 400 may be implemented with respect to either or both of the clients 402A-402B.

In one embodiment, the security system 408A of the client 402A may identify the potentially malicious data 406A by monitoring the client 402A for malicious data. Further, the security system 408A may determine that data 406A on such client 402A is potentially malicious in response to a determination that the data 406A does not match known malicious data and does not match known clean (e.g. non-malicious) data. Such known malicious data and known clean data may be stored in a database on the client 402A, for example.

In response to the identification of the potentially malicious data 406A, the security system 408A may send the potentially malicious data 406A to the server 404. In one embodiment, the potentially malicious data 406A may be sent to the server 404 for determining whether the potentially malicious data 406A is actually malicious. For example, the potentially malicious data 406A may be sent to the server 404 for analyzing the potentially malicious data 406A determine whether such is malicious.

Based on receipt of the potentially malicious data 406A, the server 404 automatically identifies the potentially malicious data 406A as malicious. For example, the server 404 may identify the potentially malicious data 406A as malicious without necessarily analyzing the potentially malicious data 406A. In one exemplary embodiment, the server 404 may identify the potentially malicious data 406A as malicious based on an identification of the client 402A from which the potentially malicious data 406A was received as a previous source of malicious data.

Further, the server 404 stores the data automatically identified as malicious (or a hash thereof) in a list of known malicious data 410 located on the server 404. In this way, the data may be stored in the list of known malicious data 410 for use in detecting malicious data. As an option, an identifier indicating that the data was potentially malicious data automatically identified as malicious may be stored in association with the data. Thus, the list of known malicious data 410 may optionally include data with an identifier indicating that the data was potentially malicious data automatically identified as malicious and data with an identifier indicating that the data is malicious (e.g. as determined based on an analysis of the data, etc.).

Still yet, once the server 404 is able to analyze the stored data automatically identified as malicious (e.g. in response to resources being available for such analysis, etc.), the server 404 may perform the analysis on the stored data. If the server 404 determines that the stored data is malicious, based on the analysis, the server 404 may create an updated data (DAT) file 414 (or update an existing DAT file) to include such data as known malicious data. As an option, the server 404 may also change the identifier stored with the data in the list of known malicious data 410 to indicate that the data is malicious (e.g. as determined based on an analysis of the data, as determined by other sources that periodically distribute updates to the list of known malicious data 410, etc.).

If, however, the server 404 determines that the stored data is not malicious, based on the analysis, the server 404 may create the updated DAT file 414 (or update any existing DAT file) to include such data as known clean (e.g. non-malicious) data. Optionally, the server 404 may also remove the data from the list of known malicious data 410 and may store such data in a list of known clean data 412 (e.g. a list of data predetermined to be clean, etc.). As another option, the list of known clean data 412 may also be populated with data from software vendors (e.g. operating system vendors), data determined to be clean based on an analysis of such data by the server 404, data determined to be clean based on a manual analysis (e.g. by human researchers) of such data, data from publicly available databases including known clean data (e.g. National Institute of Standards and Technology database, National Software Reference Library database, etc.), etc.

Furthermore, the server 404 may transmit the DAT 414 (e.g. as an update, etc.), which includes the data identified as malicious or clean, to the clients 402A-402B. In this way, a list of known malicious data or a list of known clean data located on the clients 402A-402B (not shown) may be updated for use in subsequent detections of malicious data.

Just by way of example, after storing the data in the list of known malicious data 410, other data may be identified by a security system 408A-408B of at least one of the clients 402A-402B as potentially malicious. Based on the identification of the other potentially malicious data, the security system 408A-408B may calculate a hash of the other potentially malicious data. In addition, the security system 408A-408B may remotely query the server 404 for the hash [e.g. via a direct connection between the client 402A-B and the server 404, via a domain name server (DNS) cloud, etc.]. Of course, while the query is described herein as including the hash of the other potentially malicious data, it should be noted that the query may include the other potentially malicious data itself and/or any other information capable of being used to identify the other potentially malicious data.

The server 404 may subsequently receive the query, and may compare the hash received via the query with the list of known malicious data 410 and the list of known clean data 412. If the server 404 determines that the received hash matches a hash in the list of known malicious data 410, the server 404 may identify the other potentially malicious data associated with the hash as malicious. If, however, the server 404 determines that the received hash matches a hash in the list of known clean data 412, the server 404 may identify the other potentially malicious data associated with the hash as clean. Further, a result to the query identifying the other potentially malicious data as malicious or clean may be sent to the client 402A-402B from which the query was received.

It should be further noted that if the server 404 determines that the received hash does not match hashes include in either of the list of known malicious data 410 or the list of known clean data 412, the server 404 may automatically determine that the other potentially malicious data associated with the hash is malicious, and may store a hash of the potentially malicious data in the list of known malicious data 410, as described above.

Figure 5:
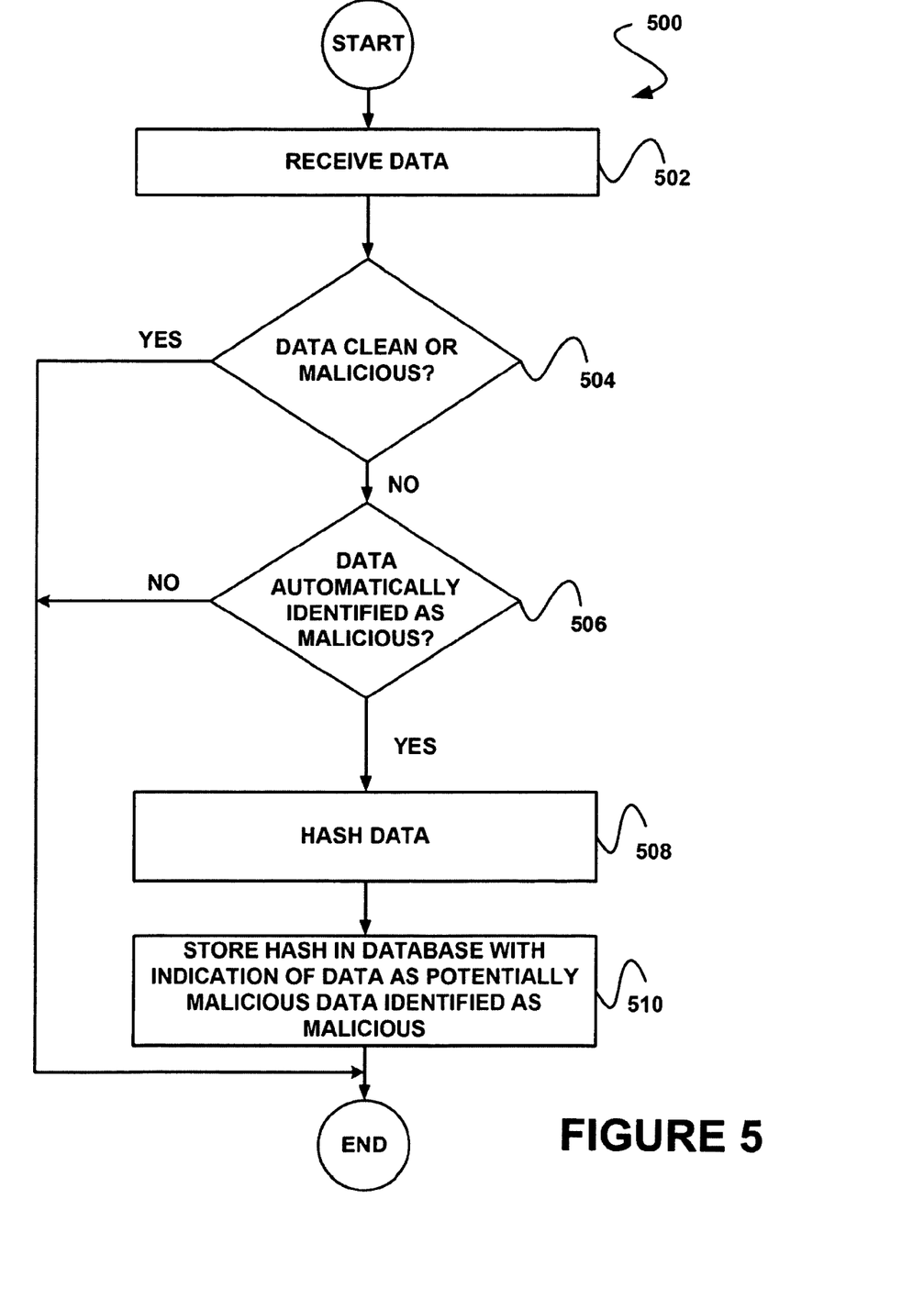
FIG. 5 shows a method for storing a hash of data with an indication of whether the data is potentially malicious or potentially clean, in accordance with yet another embodiment.

FIG. 5 shows a method 500 for storing a hash of data with an indication of whether the data is potentially malicious or potentially clean, in accordance with yet another embodiment. As an option, the method 500 may be carried out in the context of the architecture and environment of FIGS. 1-4. For example, the method 500 may be carried out using the server 404 of FIG. 4. Of course, however, the method 500 may be carried out in any desired environment. It should also be noted that the aforementioned definitions may apply during the present description.

As shown in operation 502, data is received. With respect to the present embodiment, the data may be received from a client device that determined that the data is potentially malicious. For example, the data may be received by the client device in response to a determination by the client device that it is unknown whether the data is malicious or clean.

Additionally, it is determined whether the data is known to be malicious or clean, as shown in decision 504. For example, it may be determined whether the data has been predetermined to be malicious or clean. In one embodiment, the data may be compared with a list of known malicious data. For example, if the data matches data included in the list of known malicious data, the data may be determined to be known to be malicious.

In another embodiment, the data may be compared with a list of known clean data. Thus, if the data matches data included in the list of known clean data, the data may be determined to be known to be clean. If it is determined that the data is known to be malicious or clean, the method 500 terminates. As an option, an indication of whether the data is malicious or clean may be sent to the source from which the data was received (e.g. based on the determination), prior to the method 500 terminating.

If, however, it is determined that the data is not known to be malicious or clean, it is determined whether the data may be automatically identified as malicious. Note decision 506. For example, determining whether the data may be automatically identified as malicious may include determining whether the data may be identified as malicious, at least temporarily, without performing an analysis on such data for determining whether the data is in fact malicious. In one embodiment, the data may be automatically identified as malicious based on a source of the data. Of course, however, the data may be automatically identified as malicious based on any desired aspect associated with the data that does not necessarily require an analysis of the data itself (e.g. an analysis of content of the data, etc.).

If it is determined that the data may not be automatically identified as malicious, the method 500 terminates. As an option, the client device from which the data was received may wait for the analysis to be performed on the data before such client device may receive an indication of whether the data is malicious. As another option, the client device may be notified that such analysis is required before any indication will be received by the client device.

If, however, it is determined that the data may be automatically identified as malicious, the data is hashed. Note operation 508. Furthermore, the hash is stored in a database with an indication that the data is potentially malicious data automatically identified as malicious, as shown in operation 510. To this end, the hash of the data may be stored such that the hash may be used for detecting unwanted data. As an option, an indication that the data has been automatically identified as malicious may be sent to the client device from which the data was received.

Figure 6:
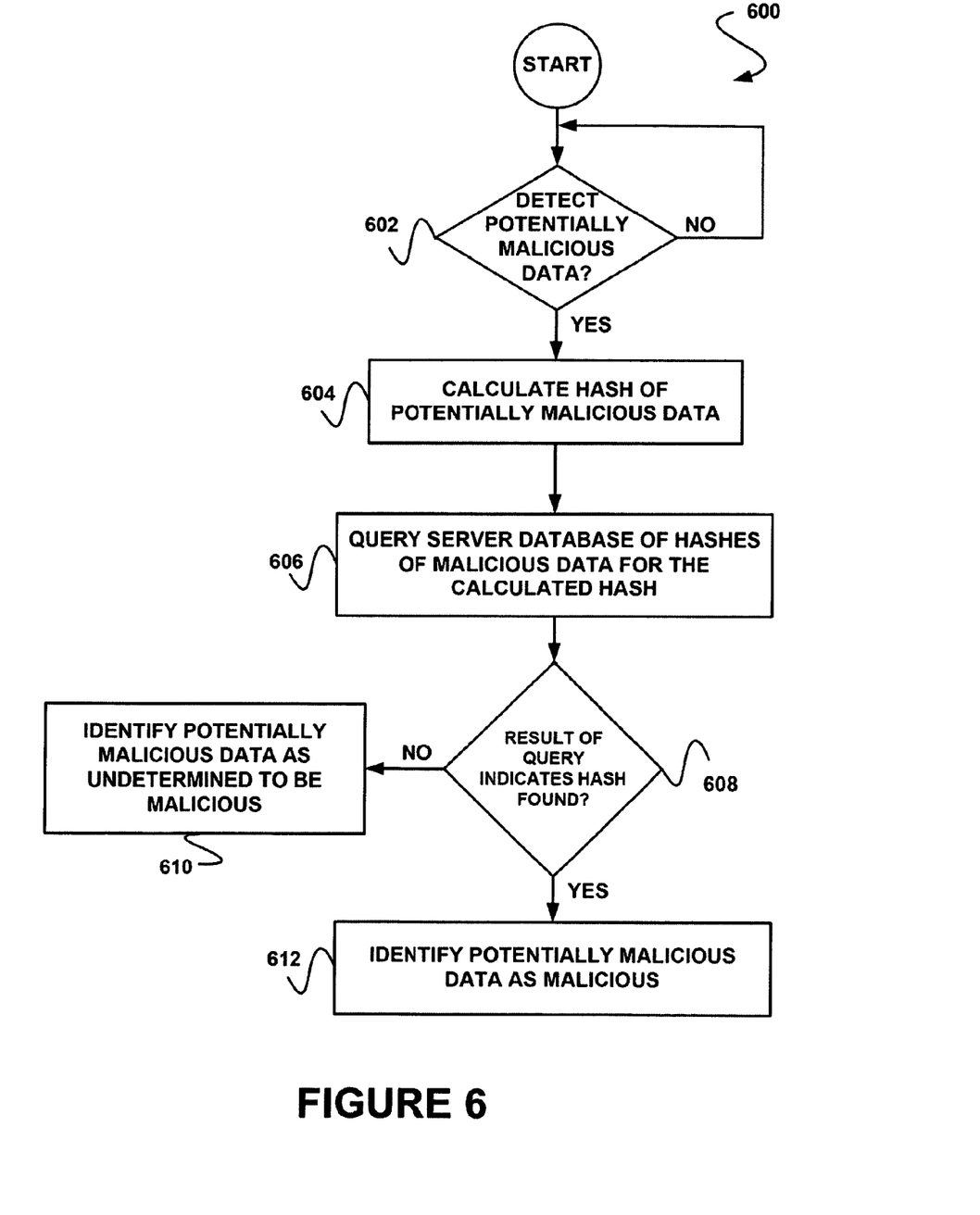
FIG. 6 shows a method for querying a database of hashes for identifying potentially malicious data as malicious, in accordance with still yet another embodiment.

FIG. 6 shows a method 600 for querying a database of hashes for identifying potentially malicious data as malicious, in accordance with still yet another embodiment. As an option, the method 600 may be carried out in the context of the architecture and environment of FIGS. 1-5. For example, the method 600 may be carried out using one of the clients 402A-402B of FIG. 4. Of course, however, the method 600 may be carried out in any desired environment. Again, it should be noted that the aforementioned definitions may apply during the present description.

As shown in decision 602, it is determined whether potentially malicious data is detected. The data may be determined to be potentially malicious if it is determined that it is unknown whether the data is malicious or clean. For example, if the data does not match known malicious data or known clean data (e.g. stored on the device on which the data is located), the data may be determined to be malicious.

If it is determined that potentially malicious data is not detected, the method 600 continues to wait for potentially malicious data to be detected. If, however, it is determined that potentially malicious data is detected, a hash of the potentially malicious data is calculated. Note operation 604.

Additionally, a server database of hashes of malicious data is queried for the calculated hash, as shown in operation 606. Thus, the query may include a remote query. In one embodiment, the server database of hashes of malicious data may include any database storing hashes of known malicious data. For example, the server database of hashes of malicious data may include the list of known malicious data 410 of FIG. 4.

Furthermore, as shown indecision 608, it is determined whether a result of the query indicates that the calculated hash is found in the server database of hashes of malicious data. If, it is determined that the result of the query indicates that the calculated hash is not found in the server database of hashes of malicious data, the potentially malicious data detected in operation 602 is identified as undetermined to be malicious. Note operation 610. As an option, the server storing the server database of hashes of malicious data may also identify the potentially malicious data as undetermined to be malicious if the result of the query indicates that the calculated hash is not found in the server database of hashes of malicious data.

Moreover, in response to a determination by the server that the potentially malicious data is undetermined to be malicious, the server may optionally automatically identify the potentially malicious data as malicious (e.g. as described above with respect to the method 500 of FIG. 5). If it is determined that the result of the query indicates that the calculated hash is found in the server database of hashes of malicious data, the potentially malicious data detected in operation 602 is identified as malicious. Note operation 612.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for receiving data by a server, wherein the data is not known to be wanted and wherein the data is not known to be unwanted;
   computer code for assigning a weight to each source from which the data was received;
   computer code for calculating an aggregate weight from the weights assigned to each source from which the data was received; and
   computer code for automatically identifying by the server that the data is unwanted if the aggregate weight meets a predetermined threshold weight; and
   computer code for storing the data by the server for use in detecting unwanted data.

2. The computer program product of claim 1, wherein the data is not known to be malicious and wherein the data is not known to be non-malicious.

3. The computer program product of claim 1, wherein the data does not match known wanted data and does not match known unwanted data.

4. The computer program product of claim 1, wherein the data is automatically received based on monitoring of at least one of an electronic messaging application, file transfer protocol (FTP), and a web site.

5. The computer program product of claim 1, wherein the data is automatically identified as unwanted based on at least one source from which the data is received.

6. The computer program product of claim 5, wherein the source includes a security vendor.

7. The computer program product of claim 5, wherein the source includes a honeypot.

8. The computer program product of claim 5, wherein the data is automatically identified as unwanted if it is determined that other data previously received from the at least one source includes known unwanted data.

9. The computer program product of claim 5, wherein the data is automatically identified as unwanted if it is determined that the data was received by a predefined threshold number of different sources.

10. The computer program product of claim 5, wherein the data is automatically identified as unwanted if it is determined that a weight assigned to the at least one source meets a predefined threshold weight.

11. The computer program product of claim 1, wherein storing the data includes storing a hash of the data.

12. The computer program product of claim 1, further comprising computer code for storing an indication with the data that the data includes potentially unwanted data automatically identified as unwanted.

13. The computer program product of claim 12, further comprising computer code for identifying the data stored with the indication that the data includes potentially unwanted data automatically identified as unwanted, analyzing the data, and determining whether the data is unwanted based on the analysis.

14. The computer program product of claim 13, further comprising computer code for updating one of a list of known unwanted data and a list of known wanted data based on the determination.

15. The computer program product of claim 1, wherein the stored data is utilized for detecting the unwanted data by identifying other received data determined to be potentially unwanted as unwanted if the other received data matches the stored data.

16. A method, comprising:
receiving data by a computer processor, wherein the data is not known to be wanted and wherein the data is not known to be unwanted;
assigning a weight to each source from which the data was received;
calculating an aggregate weight from the weights assigned to each source from which the data was received;
identifying automatically that the data is unwanted if the aggregate weight meets a predetermined threshold weight; and
storing the data for use in detecting unwanted data.

17. A system, comprising:
a computer processor for receiving data, wherein the data is not known to be wanted and wherein the data is not known to be unwanted, assigning a weight to each source from which the data was received, calculating an aggregate weight from the weights assigned to each source from which the data was received, identifying automatically that the data is unwanted if the aggregate weight meets a predetermined threshold weight, and storing the data for use in detecting unwanted data.

18. The method of claim 16, further comprising:
identifying the data as unwanted by the computer processor by analyzing the data.

19. A method, comprising:
receiving a first data by a client computer;
analyzing the first data by the client computer, and determining that the first data is not known to be wanted and wherein the first data is not known to be unwanted;
sending the first data to a server computer;
assigning a weight to each source from which the data was received;
calculating an aggregate weight from the weights assigned to each source from which the data was received;
identifying automatically that the data is unwanted if the aggregate weight meets a predetermined threshold weight; and
storing the first data by the server computer.

20. The method of claim 19, further comprising:
analyzing the stored first data by the server computer responsive to analysis resources being available; and
identifying the stored first data as wanted or unwanted responsive to the act of analyzing the stored first data by the server computer;
updating a datastore responsive to the act of identifying the stored first data as wanted or unwanted;
distributing the updated datastore to the client computer.

21. The method of claim 19, wherein the second data comprises an identification of the client computer as a previous source of unwanted data.

22. The method of claim 19, further comprising:
using the stored first data automatically identified as unwanted for determining that a third data is unwanted.

23. The computer program product of claim 1, wherein the computer code for automatically identifying by the server the data as unwanted without analyzing the data comprises:
computer code for automatically identifying by the server the data as unwanted responsive to a second data, without analyzing the first data.

24. The method of claim 16, wherein the act of identifying the data automatically as unwanted by the computer processor without analyzing the data comprises:
identifying the data automatically as unwanted by the computer process without analyzing the data, responsive to a second data.

25. The method of claim 24, wherein the second data comprises a source from which the data is received.

* * * * *